(12) United States Patent
Vogman

(10) Patent No.: US 6,265,790 B1
(45) Date of Patent: *Jul. 24, 2001

(54) COMPUTER SYSTEM FAN CIRCUIT

(75) Inventor: Viktor D. Vogman, Olympia, WA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,578

(22) Filed: Oct. 7, 1998

(51) Int. Cl.[7] ........................................... H02J 9/08
(52) U.S. Cl. ................................. 307/64; 307/139
(58) Field of Search ............................. 307/66, 64, 126, 307/139; 361/688, 690, 695, 696, 697

(56) References Cited

U.S. PATENT DOCUMENTS

| | | |
|---|---|---|
| 5,650,608 * | 7/1997 | Redford et al. .................... 250/210 |
| 5,793,123 * | 8/1998 | Ho et al. ............................... 307/66 |
| 5,848,282 * | 12/1998 | Kang ............................... 395/750.05 |
| 5,898,296 * | 4/1999 | Maddox et al. ...................... 323/282 |
| 5,990,582 * | 11/1999 | Henderson et al. ................. 307/139 |

OTHER PUBLICATIONS

Electronics Circuits And Devices Second Edition, Author Ralph J. Smith Text p. 410 Darlington Circuit Published by John Wiley & Sons, 1980.*

* cited by examiner

Primary Examiner—Josie Ballato
Assistant Examiner—Robert L. Deberadinis
(74) Attorney, Agent, or Firm—Kenyon & Kenyon

(57) ABSTRACT

A computer system fan circuit having a primary power voltage source and a standby power voltage source. A fan control circuit is coupled to the primary power voltage source, the standby power voltage source and a power supply fan. In this way, power may be provided to the power supply fan when a power supply is in either a fill power mode or a standby power mode. In another embodiment, a ripple filter circuit is coupled to a voltage source and a system fan. The ripple filter circuit may be, for example, an active suppression current limiter circuit that limits the current drawn by one or more system fans.

16 Claims, 6 Drawing Sheets

COMPUTER SYSTEM FAN CIRCUIT

FIELD

The present invention relates to computer systems. More particularly, the present invention relates to a computer system fan circuit.

BACKGROUND

A computer system power supply generates heat when providing power to the computer system. To improve the power supply's performance, and to protect components in the computer system, it is known that a power supply fan can be used to blow air over and cool the power supply.

Typically, a computer system power supply operates in either a main power-on state, i.e. a "full power" mode, or main power-off state, i.e. a "standby power" mode. In the full power mode, the main power supply outputs are enabled to provide power to the components in the computer system. In the standby power mode, fewer computer system components are operational and, therefore, less power needs to be provided by the power supply.

FIG. 1 illustrates a known power supply fan circuit for a computer system. A power supply (PS) fan 10 is coupled between the power supply's main 12 volt (V) line 20 and ground. The load placed on the power supply in full power mode by the components in the computer system is represented by a resistor R1 25 coupled between the main 12 V line 20 and ground. The load placed on the power supply in standby mode, when less than all of the components are operational, is represented by a resister R2 35 coupled between a 5 V standby (SdBy) line 30 and ground. The 5 V standby line 30 may be provided, for example, by a standby auxiliary converter in the power supply. Note that the power supply fan 10 is not coupled to the 5 V standby line 30.

When the power supply is in the fall power mode, the power supply fan 10 receives power from the main 12 V line 20. This causes the power supply fan 10 to blow air over and cool the power supply. When the power supply is in the standby power mode, no power is provided to the power supply fan 10, which therefore does not blow air over or cool the power supply. This typically has been acceptable because a power supply may generate less heat in the standby power mode, and therefore may not need to be cooled.

Some computer systems, however, require that a power supply provide more power in the standby power mode as compared to other computer systems. In such computer systems, additional heat sinks or fans have been used to cool the power supply when in standby power mode. These solutions, however, increase the cost and size of the power supply unit.

Another problem associated with fans in a computer system relates to system fans that are used to cool components in the computer system. For example, FIG. 2 illustrates a known system fan circuit for a computer system. Two system fans 40, 50 are each coupled between a 12 V power supply output 60 and ground. The capacitance of the power supply is represented by a capacitor C0 65 that is coupled between the 12 V output 60 and ground.

The operation of each system fan 40, 50 draws current from the power supply in pulses at a frequency of, for example, 100 hertz (Hz). This type of current draw creates a step-loading condition to the power supply, causing a power supply "ripple voltage" to be distributed to other components in the computer system. That is, a pulse of current will cause a momentary voltage drop because the power supply has an equivalent internal resistance. The higher the magnitude of this current pulse, the greater the voltage drop at the power supply terminals. A feed back loop eventually regulates out this voltage drop, but the resulting fluctuations in the voltage signal is referred to as a "ripple." Because the frequency of the current pulse from the two system fans may not be equal, periodically both system fans may draw current simultaneously. This will further increase the ripple noise in the system.

The operation of some computer system components can be disrupted when the ripple noise becomes too large. For example, a hard disk drive may require that the system's ripple peak-to-peak magnitude, including transient response, not exceed 0.8%. To reduce ripple noise, a traditional filter, such as a passive Resistance-Capacitance (RC) or Inductance-Capacitance (LC) filter, may be used. For example, to bring ripple noise down to a required level, a 16 V-12,000 microfarad ($\mu$F) capacitance may need to be placed on the 12 V bus. This, however, significantly increases the cost of the computer system.

In view of the foregoing, it can be appreciated that a need exists for a computer system fan circuit that solves the problems discussed above.

SUMMARY

In accordance with an embodiment of the present invention, a power supply fan circuit for a computer system has a primary power voltage source and a standby power voltage source. A fan control circuit is coupled to the primary power voltage source, the standby power voltage source and a power supply fan.

In accordance with another embodiment of the present invention, a system fan circuit for a computer system has a voltage source and a first system fan. A ripple filter circuit is coupled to the voltage source and the first system fan.

DETAILED DESCRIPTION

Figure 1:
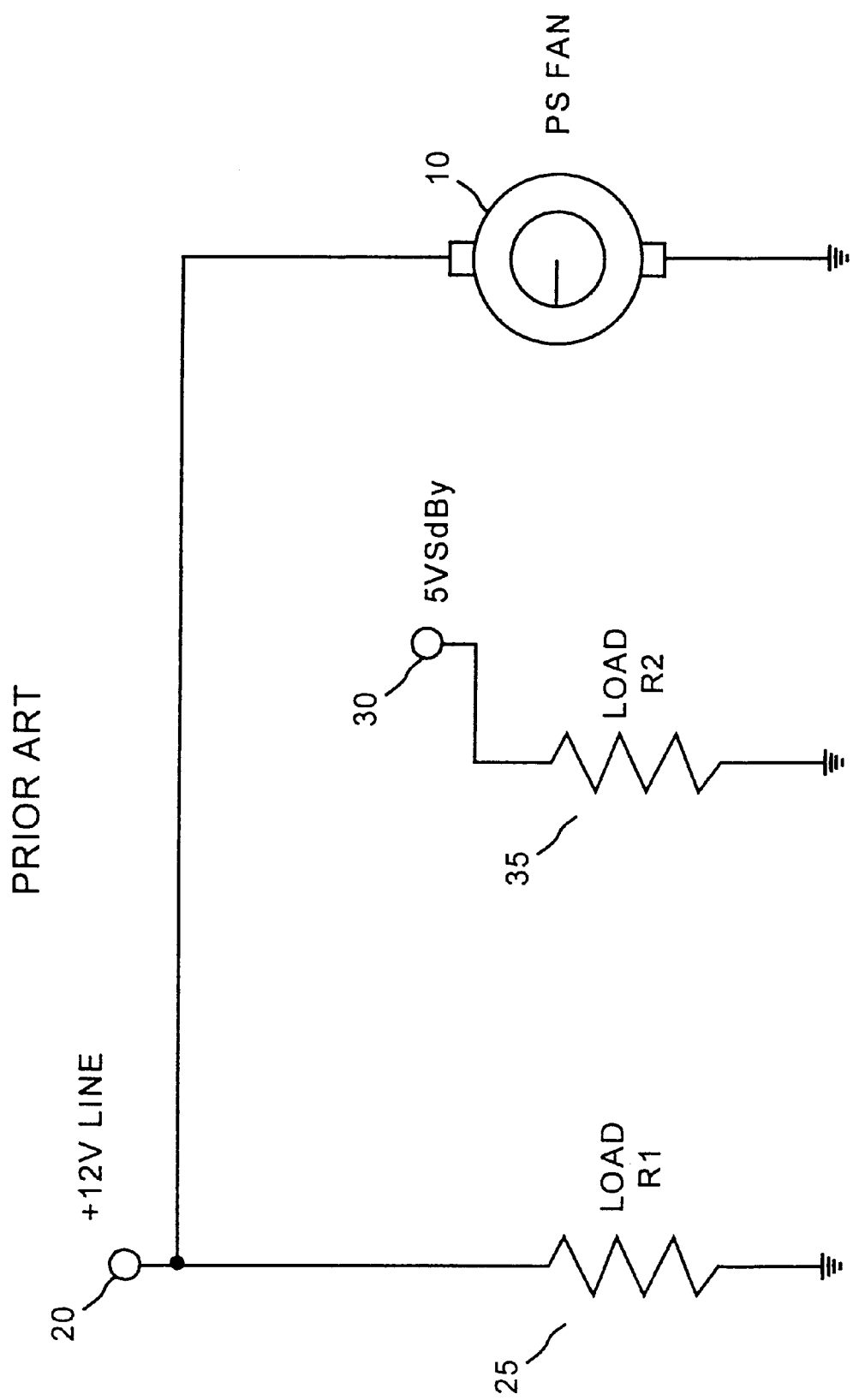
FIG. 1 illustrates a known power supply fan circuit for a computer system.
Figure 2:
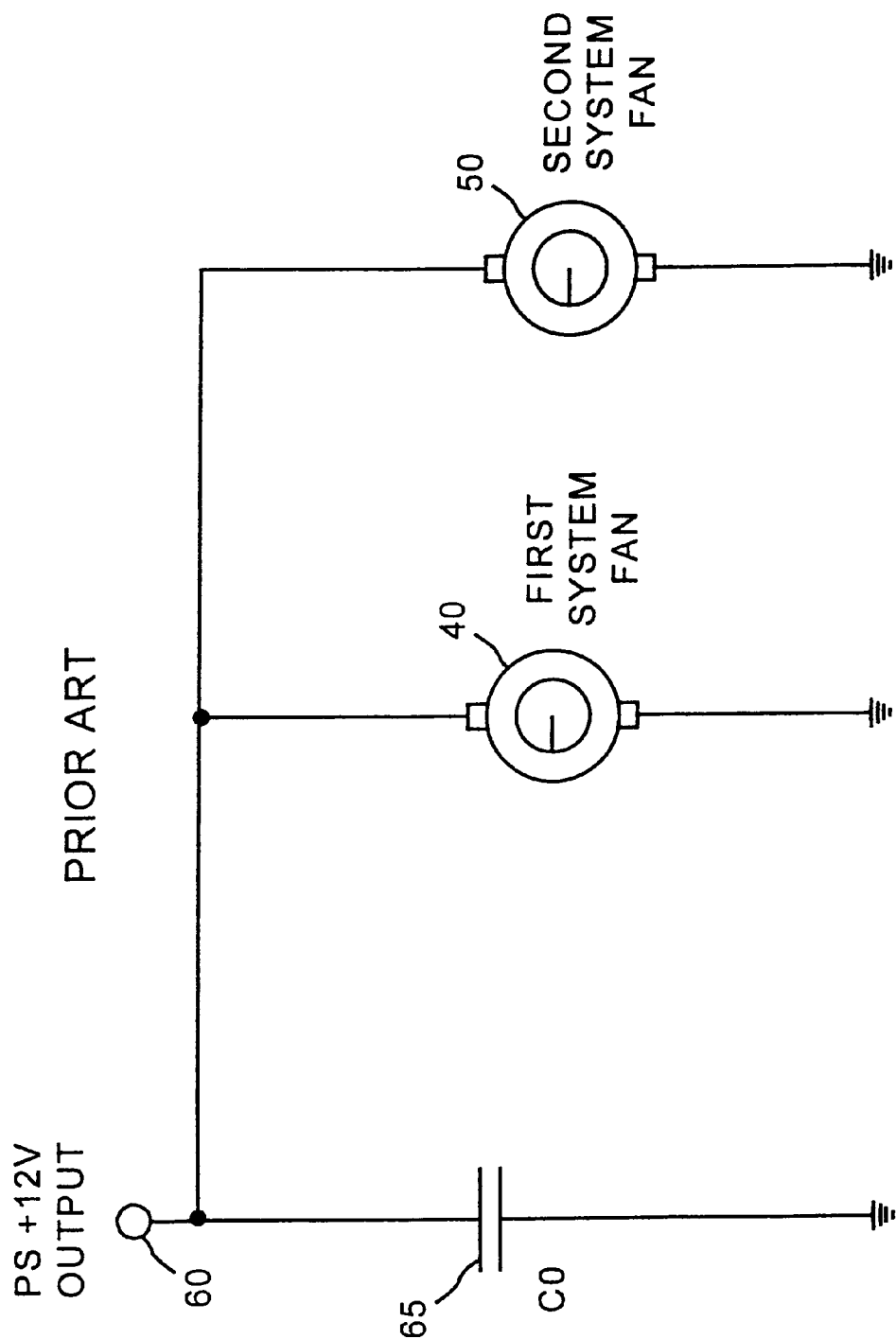
FIG. 2 illustrates a known system fan circuit for a computer system.
Figure 3:
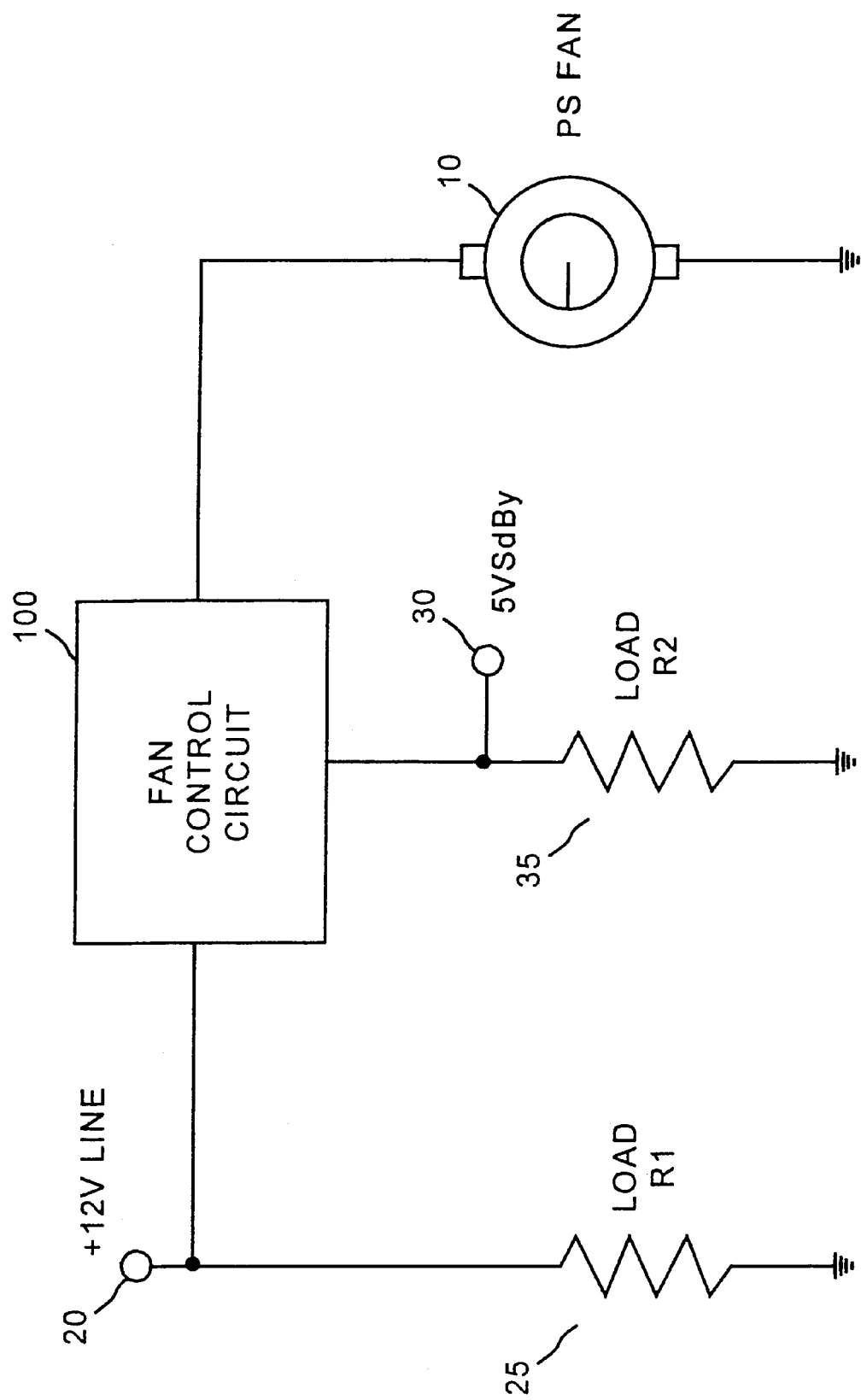
FIG. 3 is a block diagram of a power supply fan control circuit according to an embodiment of the present invention.

An embodiment of the present invention is directed to a power supply fan control circuit. Referring now in detail to the drawings wherein like parts are designated by like reference numerals throughout, FIG. 3 is a block diagram of a power supply fan control circuit according to an embodiment of the present invention. The load placed on the power supply in full power mode by components in the computer system is represented by a resistor R1 25 coupled between a main 12 V line 20 and ground. The load placed on the power supply in the standby power mode, when less than all of the components are operational, is represented by a resistor R2 35 coupled between a 5 V standby (SdBy) line 30 and ground.

According to an embodiment of the present invention, a fan control circuit 100 is coupled to the main 12 V line 20, the 5 V standby line 30 and a power supply (PS) fan 10. When the power supply is in the full power mode, the power supply fan 10 receives power from the main 12 V line 20. This causes the power supply fan to blow air over and cool the power supply. When the power supply is in the standby power mode, the power supply fan 10 receives power from the 5 V standby line 30. This causes the power supply fan 10 to blow air over and cool the power supply, although the power supply fan 10 may operate at a lower speed because of the lower voltage. The lower speed may be acceptable because the power supply may generate less heat in the standby power mode as compared to the full power mode.

Figure 4:
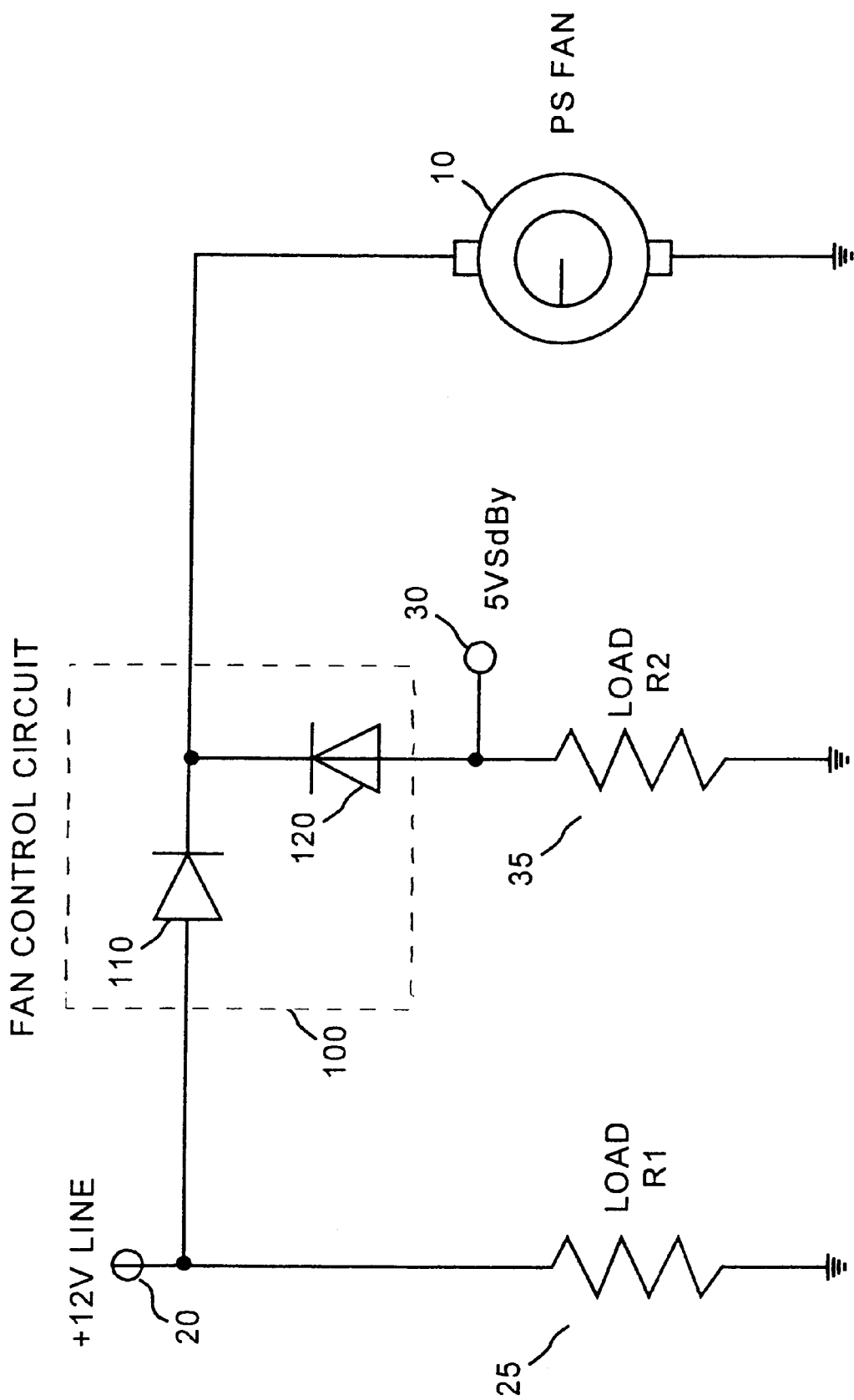
FIG. 4 is a power supply fan control circuit according to an embodiment of the present invention.

FIG. 4 illustrates a power supply fan control circuit according to an embodiment of the present invention. As before, the load placed on the power supply in the full power mode is represented by a resistor R1 25 coupled between a main 12 V line 20 and ground, and the load in the standby power mode is represented by a resistor R2 35 coupled between the 5 V standby line 30 and ground. A fan control circuit 100 is coupled to the main 12 V line 20, the 5 V standby line 30 and a power supply (PS) fan 10.

According to an embodiment of the present invention, the fan control circuit 100 comprises a first diode 110 coupled between main 12 V line 20 and the power supply fan 10. The fan control circuit 100 also comprises a second diode 120 coupled between the 5 V standby line 30 and the power supply fan 10. The first diode 110 and the second diode 120 are both oriented to permit current flow toward the power supply fan 10.

When the power supply is in the full power mode, the power supply fan 10 receives power from the main 12 V line 20 through the first diode 110, and the second diode 120 prevents this current from reaching resistor R2 35. When the power supply is in the standby power mode, the main 12 V line has no power. In this case, the power supply fan 10 receives power from the 5 V standby line 30 through the second diode 120, and the first diode 110 prevents current from reaching resistor R1 25. In effect, the first diode 110 and second diode 120 act as a voltage selector to prevent, for example, a 5 V standby line 30 over-voltage or over-current condition.

Thus, the fan control circuit 100 provides an additional path for power supply fan 10 current when the power supply is in the standby power mode. This cools the power supply, and the amount of power provided in the standby power mode may be increased, if desired. Moreover, it provides an airflow level sufficient to reduce the need for additional heat sinks or expensive portable fans, even when the power needed in the standby power mode is increased.

Figure 5:
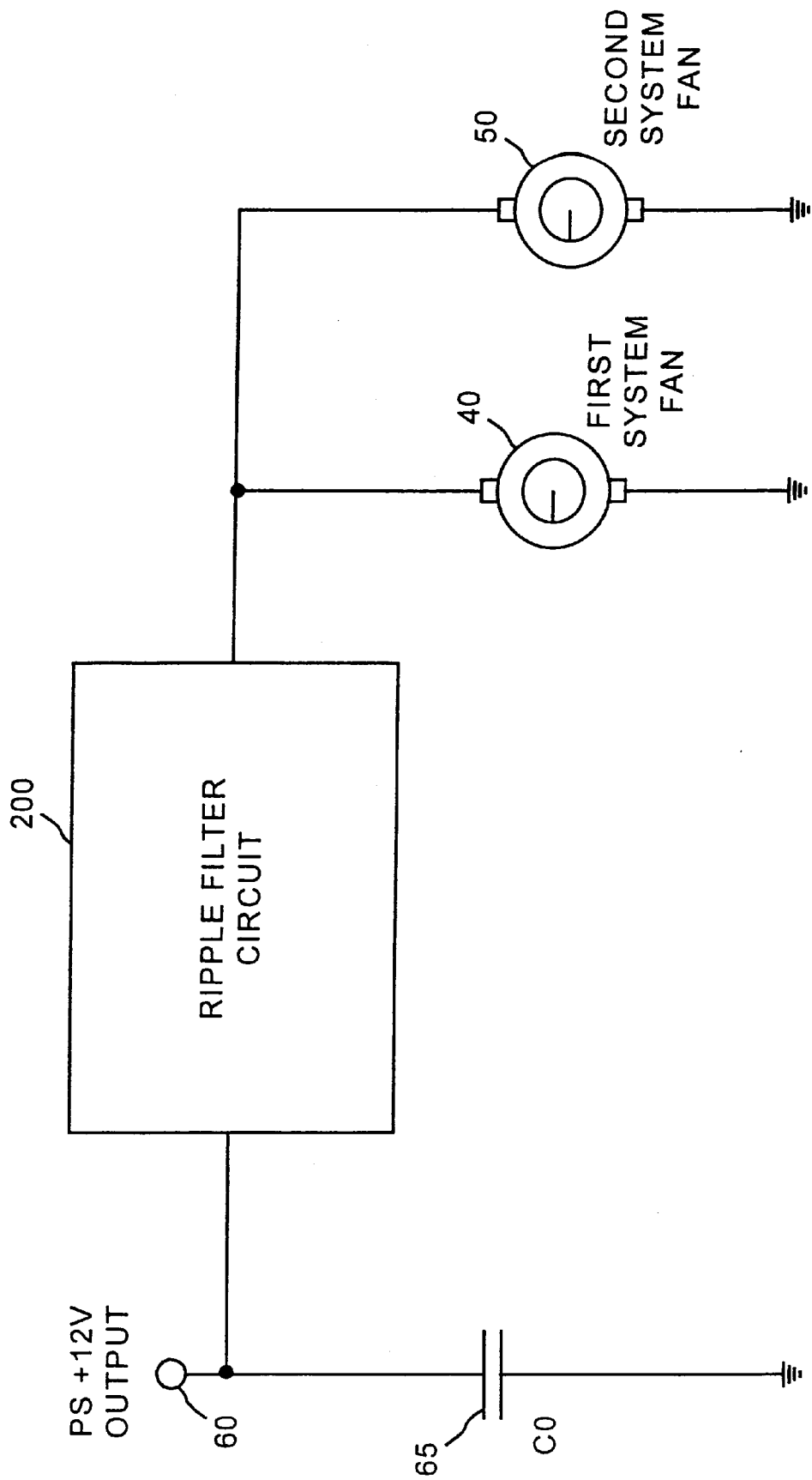
FIG. 5 is a block diagram of a system fan ripple suppression circuit according to an embodiment of the present invention.

FIG. 5 is a block diagram of a system fan ripple suppression circuit according to an embodiment of the present invention. The output filter capacitance of the power supply is represented by a capacitor C0 65 coupled between a 12 V output 60 and ground.

According to an embodiment of the present invention, a ripple filter circuit 200 is also coupled to the 12 V output 60. Two system fans 40, 50 are coupled between the ripple filter circuit 200 and ground. The ripple filter circuit 100 may be, for example, an active suppression current limiter circuit that limits the amount of current drawn by the two system fans 40, 50. The operation of each system fan 40, 50 draws current from the power supply in pulses. When both system fans 40, 50 do not draw current simultaneously, the current step is sufficiently small and the ripple filter circuit 200 does not alter the current flow. When both system fans draw current simultaneously, the ripple filter circuit 200 limits the current to a pre-determined level to reduce the ripple voltage in the system.

Because the ripple filter circuit 200 may sometimes limit the current drawn by the system fans 40, 50, the systems fans 40, 50 may sometimes operate at a slower rate. The impact on cooling ability, however, should be relatively small because the amount of time that the ripple filter circuit 200 will actually limit the current should be relatively short. For example, with two typical system fans 40, 50 drawing current pulses at a frequency of 100 Hz, the ripple filter circuit 200 may only need to limit current for a few milliseconds (msec) every few seconds.

Figure 6:
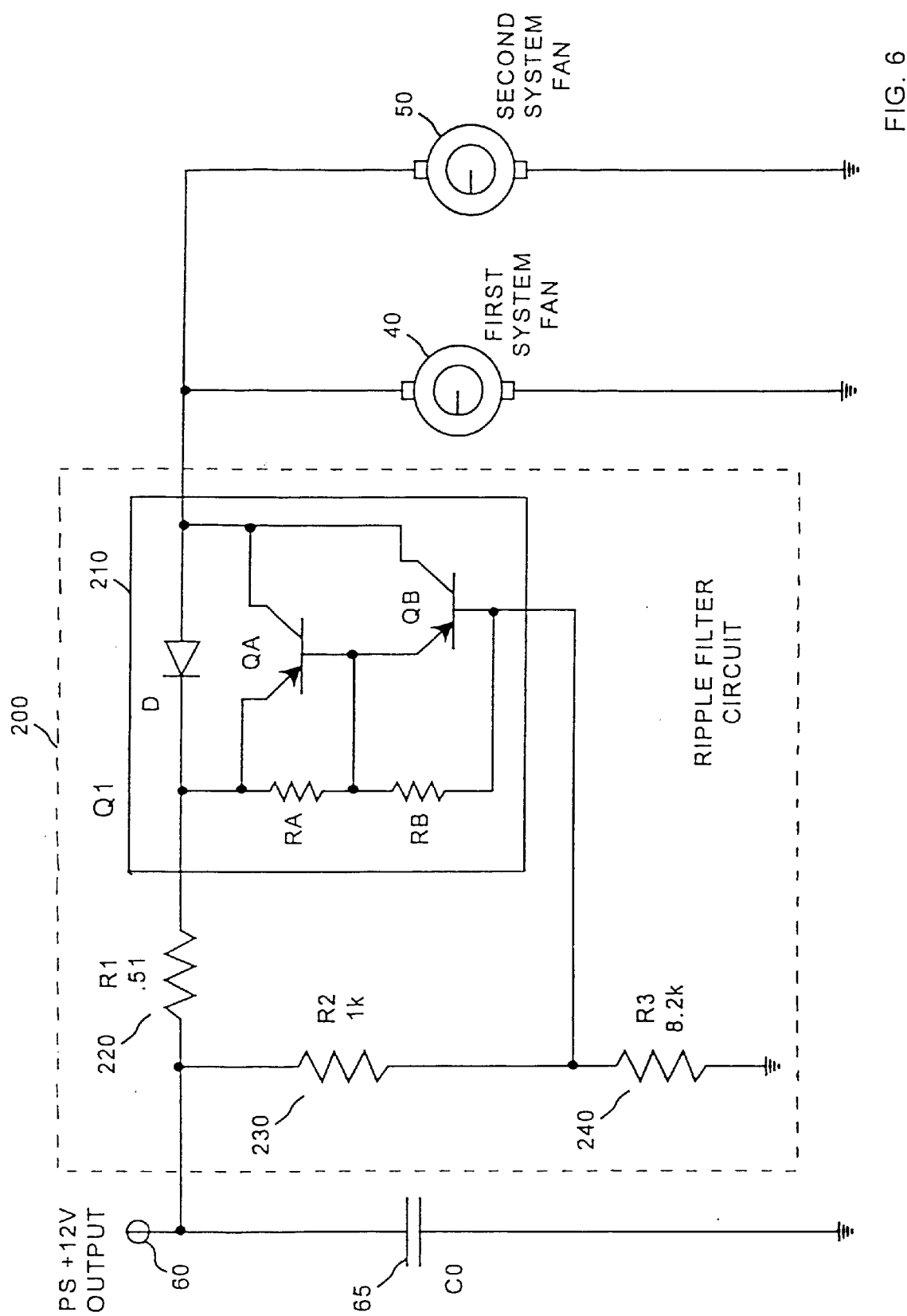
FIG. 6 is a system fan ripple suppression circuit according to an embodiment of the present invention.

FIG. 6 illustrates a system fan ripple suppression circuit according to an embodiment of the present invention. As before, the capacitance of the power supply is represented by an output filter capacitor C0 65 coupled between a 12 V output 60 and ground, a ripple filter circuit 200 is coupled to the 12 V output 60 and two system fans 40, 50 are coupled between the ripple filter circuit 200 and ground.

According to an embodiment of the present invention, the ripple filter circuit 200 includes a transistor Q1 210 with a collector coupled to the two system fans 40, 50. The transistor Q1 210 also has an emitter and a base. A first resistor R1 220, such as a 0.51 ohm ($\Omega$) resistor, is coupled between the 12 V output 60 and the emitter of the transistor Q1 210. A second resistor R2 230, such as a 1 kilo-ohm (K$\Omega$) resistor, is coupled between the 12 V output 60 and the base of the transistor Q1 210. Finally, a third resistor R3 240, such as a 8.2 K$\Omega$ resistor, is coupled between the base of the transistor Q1 210 and ground.

As shown in FIG. 6, and as is known in the art, transistor Q1 210 may be, for example, a p-n-p "Darlington" transistor formed of two p-n-p transistors $Q_A$, $Q_B$, two resistors $R_A$, $R_B$ and a diode D. A Darlington transistor, also known as a "compound" transistor, uses two transistors, in this case $Q_A$ and $Q_B$, such that the emitter of one transistor drives the base of the other transistor. This creates, in effect, a single transistor capable of enhanced performance, including the fact that the current amplification coefficient ($\beta$) of the Darlington transistor is the product of the $\beta$s of the individual transistors.

The ripple filter circuit 200 is a current limiter built on the base of the p-n-p Darlington transistor current source node, and represents a current source created by the emitter follower Q1 210, R1 220. The current limiting level depends on resistance of the resistors R1 220, R2 230 and R3 240. When the resistance of the resistors R2 230 and R3 240 are much greater than the resistance of the resistor R1 220 multiplied by "$\beta$," where $\beta$ is the current amplification coefficient of transistor Q1 210, the current limiting level may be set simply by changing the resistance of the resistor R3 240. Under this condition, the circuit sensitivity to ambient temperature changes mostly depends on the temperature coefficient of the resistor R3 240.

Although various embodiments are specifically illustrated and described herein, it will be appreciated that modifications and variations of the present invention are covered by the above teachings and within the purview of the appended claims without departing from the spirit and intended scope of the invention. For example, although particular circuits and components were used to illustrate various embodiments of the present invention, it will be appreciated that other circuits and components will also fall within the scope of the invention.

What is claimed is:

1. A power supply fan circuit for a computer system, comprising:
    a primary power voltage source having a first voltage;
    a standby power voltage source having a second voltage lower than said first voltage;
    a power supply fan; and
    a fan control circuit coupling said primary power voltage source and said standby power voltage source to said power supply fan, said fan control circuit being configured to provide power to said power supply fan from said primary power voltage source when available and from said standby power voltage source when power is not available from said primary power voltage source.

2. The power supply fan circuit of claim 1, wherein said primary and standby power voltage sources comprise a power supply having a full power mode and a standby power mode, and wherein said primary power voltage source is a first output of said power supply configured to provide power when said power supply is in the full power mode, and said standby power voltage source is a second output of said power supply configured to provide power when the power supply is in the standby power mode.

3. The power supply fan circuit of claim 1, wherein said power supply fan is further coupled to ground.

4. The power supply fan circuit of claim 1, further comprising:
    a first system fan; and
    a ripple filter circuit coupled to said first system fan and one of said primary power voltage source and said standby power voltage source.

5. The power supply fan circuit of claim 1, wherein said fan control circuit comprises:
    a first diode coupled between said primary power voltage source and said power supply fan; and
    a second diode coupled between said standby power voltage source and said power supply fan;
    wherein said first and second diodes are oriented to permit current flow toward said power supply fan.

6. A power supply fan circuit for a computer system, comprising:
    a power supply having a fill power mode in which said power supply supplies only a first voltage from a primary power voltage source to a first number of components in the computer system which form a first load and a standby power mode in which said power supply supplies only a second voltage from a standby power voltage source to a second, smaller number of components in the computer system which form a second load, said second voltage being lower than said first voltage and said second load being smaller than said first load; and
    a power supply fan coupled to said power supply such that said power supply fan receives power at said first voltage when said power supply is in the full power mode and at said second voltage when said powers supply is in the standby power mode.

7. A method of supplying power to a power supply fan in a computer system, comprising:
    providing a first voltage to a power supply fan from a primary power voltage source when the power supply is in a full power mode in which it is supplying the first voltage from the primary voltage source to a first number of components in the computer system which form a first load; and
    providing a second voltage, lower then the first voltage, to the power supply fan from a standby power voltage source when the power supply is in a standby power mode in which it is supplying the the second voltage from the standby voltage source to a second, smaller number of components in the computer system which form a second, smaller load when the power is in the standby power mode.

8. The method of claim 7, wherein said steps of providing are performed by switching between a first and second current path from the power supply to the power supply fan.

9. A system fan circuit for a computer system, comprising:
    a dc voltage source;
    a first system fan and a second system fan; and
    a ripple filter circuit for reducing a ripple voltage, said ripple filter circuit coupled in series between said dc voltage source and said first and said second system fans, wherein said ripple filter circuit is configured to limit an amount of current drawn when said first system fan and said second system fan draw current simultaneously.

10. The system fan circuit of claim 9, wherein said ripple filter circuit comprises: an active suppression current limiter circuit.

11. The system fan circuit of claim 10, wherein said active suppression current limiter circuit is configured to limit said amount of current drawn when said first system fan and said second system fan draw current simultaneously.

12. The system fan circuit of claim 10, wherein said active suppression current limiter circuit comprises:
    a transistor having a collector coupled to said first system fan, an emitter and a base;
    a first resistor coupled between said voltage source and said transistor's emitter;
    a second resistor coupled between said voltage source and said transistor's base; and
    a third resistor coupled between said transistor's base and ground.

13. The system fan circuit of claim 12, wherein said transistor comprises a p-n-p Darlington transistor.

14. The system fan circuit of claim 12, wherein the values of the resistance of said second and said third resistor are significantly greater than the value of the resistance of the first resistor multiplied by $\beta$, where $\beta$ is the current amplification coefficient of said transistor.

15. The system fan circuit of claim 9, further comprising:
    a primary power voltage source having a first voltage;
    a standby power voltage source having a second voltage lower than said first voltage;
    a power supply fan; and
    a fan control circuit coupling said primary power voltage source and said standby power voltage source to said power supply fan.

16. A method of reducing a ripple voltage caused by pulsed operation of a plurality of dc voltage driven system fans in a computer system, comprising:
    limiting the current simultaneously drawn by the plurality of system fans using an active suppression current limiter circuit coupling in series a voltage source and filter to said plurality of system fans.

* * * * *